United States Patent Office

3,004,897
Patented Oct. 17, 1961

3,004,897
DENTAL PREPARATION
Joseph Shore, 5763 Woodcrest Ave., Philadelphia, Pa.
No Drawing. Filed Feb. 9, 1955, Ser. No. 487,210
11 Claims. (Cl. 167—93)

This invention is that of tartar-combating (that is to say, tartar-removing as well as tartar-deposit-preventing) dental preparations. They are applicable to the teeth by mere usual brushing with the ordinary tooth-brush and are generally innocuous to the teeth and gums even in regular daily applications.

The tartar-combating preparations of the invention comprise at least these three adequately water-soluble constituents in certain below described proportions to one another: (a) a tri(monovalent alkali-cation) salt of ethylenediamine tetraacetic acid, (b) a monovalent alkali-cation hexametaphosphate, and (c) one or both of a monovalent alkali-cation pyrophosphate or tripolyphosphate. It is advantageous to include a quantity of an innocuous water-soluble alkalizing agent to provide that the aqueous dispersion of the preparation has a pH between about 6.5 and 7.2.

By "monovalent alkali-cation" in the identity of the constituents of the preparations is intended a monovalent cation that is non-toxic in its concentration in the use of the composition, for example, an alkali metal ion such as sodium, potassium or lithium, and the like, or the ammonium ion.

The tartar-combating preparations of the invention can be put up in dry mix powder form, or as an aqueous solution advantageously in relatively concentrated form, or as a paste containing the indicated essential ingredients in a paste vehicle that is compatible with and inert to them and innocuous to the teeth and gums in the concentration in the use of the preparation. They may also be put up in any other suitable form for use by the individual alone or by the dentist for application to the teeth of patients.

Salivary calculus or tartar constantly has been a very disturbing condition not only by its undesirable influence on the appearance of the teeth, but even more so by its adverse effect on the general health of the teeth and the gums. The general discomfort and costliness of repeated visits to the dentists to have the tenacious tartar deposits broken off and burnished away from the teeth are too well known to the average individual.

Many different types of preparations have been tried in the attempts to provide one that would eliminate tartar without the need for physically breaking it off and abrading it away from the teeth and yet avoid injury to them and the gums. Many such preparations did not effect adequate removal or prevention of tartar deposits. Others that indicated a reasonably satisfactory effectiveness against the deposits were nevertheless unsatisfactory because they either etched the tooth enamel or irritated the gums.

Others dissolved or markedly destroyed the tooth structure. Among and illustrative of the substances found ineffective for use, various sodium salts, including the trisodium salt, of ethylenediamine tetraacetic acid dissolve the tooth enamel; sodium hexametaphosphate shows some tendency to remove the tartar, but is otherwise too inadequate in effectiveness to warrant its adoption for this use.

By the present invention it was developed that by admixing the tri-(monovalent alkali-cation) salt of ethylenediamine tetraacetic acid in certain proportions with more than one of certain monovalent alkali-cation phosphates there result tartar-combating preparations that remove tartar thoroughly cleanly and also are remarkably innocuous to the teeth and gums, and yet at the same time lack the various individual shortcomings of the other, unsatisfactory substances and compositions.

The products of the invention contain as their essential tartar removing and deposit-preventing constituents about five parts of the tri(monovalent alkali-cation) salt of ethylenediamine tetraacetic acid accompanied by from about twelve to about twenty-four parts of a monovalent alkali-cation hexametaphosphate together with from about three to about six parts of a least one member of the class consisting of a monovalent alkali-cation pyrophosphate and tripolyphosphate.

The aqueous solution of some of the compositions embraced within the just above described ranges may have a pH of about 6.35, and sometimes of even 6.1, and in some other cases between about 6.2 and possibly 6.5. This depends on several factors including the relative proportions of the tri-(monovalent alkali-cation) salt of ethylenediamine tetraacetic acid, the alkali-cation hexametaphosphate, and the alkali-cation pyrophosphate, and the alkali-cation pyrophosphate and/or tripolyphosphate. The higher the proportion of the more alkaline ingredient or ingredients, the higher the pH of the resulting solution.

Accordingly, an advantageous modification of the tartar-combating preparations of the invention includes along with the three to four above described essential cooperating constituents, a water-soluble innocuous alkalizing agent that is inert to the several phosphate ingredients and to the tri-monovalent alkali-cation) salt of ethylenediamine tetraacetic acid. Such alkalizing agent is included in a quantity sufficient for the resulting aqueous solution of the mixture to have a pH between about 6.4 and about 7.2, and more advantageously between about 6.5 and about 7.0, and especially beneficial between about 6.6 and about 6.8.

Presently, for example, disodium hydrogen phosphate is the most advantageous of such alkalizing agents to include in the preparations of the invention. However, there can be used any other such phosphate, or any other such alkalizing agent, especially of a non-toxic monovalent metal such as an alkali metal as potassium or lithium, and the like, or radical such as the ammonium radical.

By inert to the phosphate ingredients of the preparation, it is intended that the alkalizing agent should not react with such phosphate to form an insoluble reaction product that can deposit, or become incorporated in a deposit already, on the teeth. By inert to the salt of ethylenediamine tetraacetic acid, it is intended that the alkalizing agent should not have a cation that forms with the tri-(monovalent alkali-cation) salt of ethylenediamine tetraacetic acid a complex more readily than such salt forms a complex with the divalent cation calcium contained in any of the ingredients of the tartar.

The invention is illustrated by, but not restricted to, the following examples:

EXAMPLE 1

*Powder mix.*—The respectively shown amounts, in pounds, of the indicated ingredients in finely divided form are homogeneously mixed together:

Trisodium salt of ethylenediamine tetraacetic acid__ 10.5
Mixture consisting of about four parts of sodium
hexametaphosphate and one part consisting of
about equal quantities of sodium pyrophosphate
and sodium tripolyphosphate_____ 52.5

The resulting mixture is divided into convenient portions, for example, 65 grams each of dried powder and placed in individual market containers. Such market container can be equipped for dispensing the dry mixture directly on to a toothbrush. In addition a market container having a greater internal volume than that occupied by the powder, for example, six ounces can be used to permit adding water practically to fill the container so that the solid mixture can be dissolved as a liquid to be dispensed directly on to the toothbrush. The pH of the resulting solution will be about 6.35.

EXAMPLE 2

*Powder mix of higher pH.*—To the same quantities of the ingredients of Example 1 there are added four pounds of disodium hydrogen phosphate in finely divided form, and the ingredients are homogeneously mixed together. The resulting mixture is divided into portions of 67 grams each in individual market containers for dispensing as dry powder, or in a six ounce bottle as in Example 1, for addition of sufficient water to dissolve the mixture for dispensing in solution form. The pH of the solution will be about 6.6.

EXAMPLE 3

*Solutions.*—The individual powder mixes of Examples 1 and 2 respectively are separately dissolved in water in about the same proportions as indicated separately in the two examples to produce the corresponding solutions, each of which then can be separately packaged into individual market containers, for example, a six ounce bottle. The pH of these solutions are respectively about 6.35 and 6.6.

To any of the foregoing powder mixes and solutions there can be added suitable taste-enhancing and flavoring agents such as saccharin and others in a quantity to give a desired taste and flavor.

EXAMPLE 4

*Paste.*—The respectively shown amounts, in pounds, of the following indicated ingredients, with the solids in finely divided form, are worked together first by homogeneously mixing the solids:

| | |
|---|---|
| Diatomaceous earth | 12 |
| Cerium oxide | 12 |
| Trisodium salt of ethylenediamine tetraacetic acid | 5.3 |
| Mixture consisting of about four parts of sodium hexametaphosphate and one part consisting of about equal quantities of sodium pyrophosphate and sodium tripolyphosphate | 28.1 |

After the foregoing solids are sufficiently mixed together, there is added to them thirty-three pounds of propylene glycol and the mixture is kneaded together until uniform. Suitable taste-enhancing and flavoring agents such as saccharin and spearmint are added in quantities sufficient to give a desired taste and flavor.

The resulting paste is subdivided in jars of suitable quantity for distribution to the dentists for office use on patients. In addition, it is put up in suitable jars or collapsible tubes for distribution to the individual user.

EXAMPLE 5

*Paste (adjusted).*—To the same quantities of the solid ingredients of Example 4, there are admixed 2.14 pounds of disodium hydrogen phosphate. To the resulting mixture of solids there is then added and kneaded in the same quantity of propylene glycol.

Any of the sodium salts in any of the preceding examples can be replaced with the equivalent amount of any other monovalent alkali-cation salt of the same acid, for example the alkali metal or ammonium salt of it. The proportions of the various salts can be varied within the ranges recited in the earlier more general description of the compositions of the invention. In the pastes of Examples 4 and 5, suitable variation can be made in the proportions of the diatomaceous earth and cerium oxide, and either of them can be replaced by other substances of the same general character, all within the skill of the workers in the art.

The various powder mixes, solutions and pastes serve to remove and prevent the various types of tartar including the soft visible tartar, the serumnal tartar and the tartar deposits that discolor the teeth, and with no deleterious effect on the enamel or the cementum of the teeth.

While the invention has been illustrated by describing certain specific embodiments of it, it is understood that various modifications and substitutions can be made in them within the scope of the appended claims which are intended also to cover equivalents of the specific embodiments.

What is claimed is:

1. A tartar-combating preparation comprising as its essential tartar-combating content (a) about five parts of the tri-(monovalent-cation) salt of ethylenediamine tetraacetic acid, (b) from about twelve to about twenty-four parts of a monovalent-cation hexametaphosphate; and (c) from about three to about six parts of at least one member of the class consisting of a monovalent cation pyrophosphate and a monovalent cation tripolyphosphate; and in each of (a), (b) and (c) the monovalent cation is a member of the class consisting of an alkali metal and the ammonium ion.

2. A tartar-combating preparation as claimed in claim 1, wherein the monovalent-cation is sodium.

3. A tartar-combating preparation comprising as its essential tartar-combating content (a) about one part of the trisodium salt of ethylenediamine tetraacetic acid, (b) about four parts of sodium hexametaphosphate, and (c) one part of sodium pyrophosphate.

4. A tartar-combating preparation comprising as its essential tartar-combating content (a) about one part of the trisodium salt of ethylenediamine tetraacetic acid, (b) about four parts of sodium hexametaphosphate, and (c) one part of sodium tripolyphosphate.

5. A tartar-combating preparation comprising as its essential tartar-combating content (a) about one part of the trisodium salt of ethylenediamine tetraacetic acid, (b) about four parts of sodium hexametaphosphate, and (c) one part of a mixture of sodium pyrophosphate and sodium tripolyphosphate.

6. A tartar-combating preparation as claimed in claim 1, which contains also a water-soluble innocuous alkalizing agent inert to the tartar-combating ingredients and in a quantity sufficient for the aqueous solution of the water-soluble tartar-combating content and said agent to have a pH of from about 6.5 to about 7.2.

7. A tartar-combating preparation as claimed in claim 6, wherein the alkalizing agent is a member of the class consisting of a di(alkali metal cation) hydrogen phosphate and di-ammonium hydrogen phosphate.

8. A preparation as claimed in claim 7, wherein the alkalizing agent is disodium hydrogen phosphate.

9. A tartar-combating preparation comprising as its essential tartar-combating content (a) about one part of the trisodium salt of ethylenediamine tetraacetic acid, (b) about four parts of sodium hexametaphosphate; (c) about one part of sodium pyrophosphate; and (d) about thirty-eight one-hundredths part of disodium hydrogen phosphate.

10. A tartar-combating preparation comprising as its essential tartar-combating content (a) about one part of the trisodium salt of ethylenediamine tetraacetic acid, (b) about four parts of sodium hexametaphosphate; (c) about one part of sodium tripolyphosphate; and (d) about thirty-eight one-hundredths part of disodium hydrogen phosphate.

11. A tartar-combating preparation comprising as its essential tartar-combating content (a) about one part of the trisodium salt of ethylenediamine tetraacetic acid, (b) about four parts of sodium hexametaphosphate; (c) about one part of a mixture of sodium pyrophosphate and sodium tripolyphosphate; and (d) about thirty-eight one-hundredths part of disodium hydrogen phosphate.

(References on following page)

References Cited in the file of this patent

UNITED STATES PATENTS

| | | |
|---|---|---|
| 1,471,987 | Vogt | Oct. 23, 1923 |
| 1,691,504 | Vogt | Nov. 13, 1928 |
| 2,041,473 | Janota | May 19, 1936 |
| 2,054,742 | Elbel | Sept. 15, 1936 |
| 2,069,157 | Sahyun | Jan. 26, 1937 |
| 2,100,090 | Sommer | Nov. 23, 1937 |
| 2,191,199 | Hall | Feb. 20, 1940 |
| 2,287,699 | Moss | June 23, 1942 |
| 2,409,718 | Snell | Oct. 22, 1946 |

FOREIGN PATENTS

| | | |
|---|---|---|
| 473,894 | Great Britain | Oct. 20, 1937 |
| 473,960 | Great Britain | Oct. 20, 1937 |
| 490,384 | Great Britain | Aug. 15, 1938 |

OTHER REFERENCES

Zipkin: Proc. Soc. Expt. Biol. and Med., vol. 82, January 1953, p. 80–83.

Amer. Jour. Pharm., vol. 126, No. 6, p. 198–216.

Grossman: J. Oral Surg., Oral Med., and Oral Path., vol. 7, May 1954, pp. 484–487.